Patented Oct. 17, 1950

2,526,504

UNITED STATES PATENT OFFICE 2,526,504

PROCESS OF INCREASING BRUISE-RESISTANCE OF LOW-UNSATURATION ISOBUTYLENE-DIOLEFIN SYNTHETIC RUBBER BEFORE CURING

John Rehner, Jr., Westfield, N. J., and Paul J. Flory, Kent, Ohio, assignors to Standard Oil Development Company, a corporation of Delaware No Drawing. Application April 11, 1946, Serial No. 661,330

11 Claims. (Cl. 18—55)

This invention relates to elastic synthetic polymer structures; relates particularly to gas containers including tire inner tubes, and relates especially to processes for improving the bruise resistance and fold resistance of polymer structures by the incorporation thereinto of strengthening agents.

It has been found possible to produce an exceedingly valuable synthetic polymer of a major proportion of isobutylene with a minor proportion of a multiolefin such as butadiene, isoprene, and the like by a low temperature polymerization procedure utilizing a Friedel-Crafts catalyst, particularly dissolved aluminum chloride, to produce a synthetic polymer which is reactive with sulfur in a curing reaction to produce a material having a tensile strength ranging from 1800 to 3600 pounds per square inch; an elongation at break ranging from 500% to 1200% and a very high resistance to the diffusion of air, making it highly valuable for holding air under pressure, and particularly valuable for automobile tire inner tubes. However, difficulty has been encountered in the fabrication of such structures. The material compounds readily with zinc oxide, stearic acid, carbon black, sulfur and accelerators to yield a compound which extrudes quite readily into tubular form of appropriate thickness and diameter, readily suitable for the manufacture of inner tubes. However, the extruded material, having a relatively low modulus and a relatively high plasticity compared to natural rubber, necessitated by compounding, calendering and extruding requirements, is very easily bruised during handling, and any unexpected pressure causes a thin spot in the tube material which considerably weakens the structure and makes it useless for the desired purpose. Also factory requirements necessitate the laying of the extruded tube in folded condition in a tray, for a greater or less length of time, during which time interval the weight of the material results in an unduly sharp crease at the folded edges of the tube; which again produces a thin, weak spot in the tube, resulting in defective construction; and in rejection of the tube. Also the present processes of producing inner tubes require that the ends of the tube be spliced prior to the vulcanizing step. The splicing is accomplished by the use of metal clamps, which hold the ends of the tube in proper relationship for the splicing and the forming of the tube. During the splicing operation, the unavoidable clamp pressure also tends to produce thin spots, which also tend to weaken the structure seriously and produce many defective tubes. The sequence of manufacturing steps consists of the milling and compounding of the polymer, extruding in tubular form, splicing, "forming" to convert the straight tube into a doughnut shape by inflating the tube after splicing, and then curing in the mold. It is during the "forming" step that the defects show up, since a bruise by thinning the wall thickness permits a greater stretching at the bruised spot, thereby accentuating the reduction in thickness causing a spot in the tube which may be too thin to withstand inflation in a tire shoe.

It had been considered for long that the only feasible procedure to overcome these weak spots in the tube was the use of the utmost possible care to avoid bruises of any sort, to use the lightest possible splicing clamp pressures and to leave the tubes in trays for the shortest possible time, and then to accept the unavoidably high rejection losses as part of the factory cost.

It is now found, however, that the resistance of the material can be greatly increased to bruising, folding and clamping by the incorporation, into the original mix, of a small amount of a dinitroso benzene compound, an amount too small to produce a cure, but sufficiently great to produce a strengthened condition in the polymer. It is found that an amount of the dinitroso compound, (which in amounts greater than about 1%, is an excellent curing agent) ranging from 0.1% to about 0.0008%, preferably between 0.045% and 0.0016%, does not cure the material, but does increase its bruise resistance in the uncured form without changing its milling, extruding and calendering properties, to avoid substantially all of the thinning and weakening of tube structures which is otherwise encountered. The addition of the dinitroso compound does not cure the material. It increases the modulus somewhat (pounds pull per square inch to stretch a sample by 300%), makes the stock distinctly stiffer, raises the Williams' plasticity value and markedly increases the recovery in the Williams' Plasticity Test. It substantially improves the performance of the compound on the calender and in the tuber but does not stiffen the material sufficiently to change its processing properties by any substantial amount. In the mold, the material still flows excellently, indicating that its plasticity is not modified in the direction of a partial cure. The characteristics of the finished, cured compound are not perceptibly changed either in tensile strength, elongation, gas diffusion resistance, or sharpness of mold contours.

Thus the process of the invention mixes together a low temperature interpolymer of isobutylene with a multiolefin such as isoprene prepared at temperatures between −40 and −103° C. by the application of a dissolved Friedel-Crafts catalyst such as aluminum chloride in ethyl or methyl chloride; with approximately 5% of zinc oxide, 0 to 5% of stearic acid, from 10 to 50% of carbon black, approximately 3% of sulfur, approximately 1% of a sulfurization aid such as Tuads (tetra methyl thiuram disulfide) and from 0.0016% to 0.045% of a dinitroso compound such as dinitroso benzene to yield a milled, calendered or extruded structure having a high bruise, fold and clamp resistance. Other objects and details of the invention will be apparent from the following description:

The raw material for the present invention is the low temperature interpolymer of an iso olefin with a multiolefin prepared as is well shown in the United States Patent Nos. 2,356,127 and 2,356,128, issued August 22, 1944, to Sparks and Thomas.

As disclosed in these patents, a mixture is prepared consisting of a major proportion of isobutylene with a minor proportion of multiolefin or multi-olefinic unsaturate such as butadiene, isoprene, piperylene, dimethyl butadiene, dimethallyl, allo-ocymene, the simple olefinically unsaturated ethers, the mixed ethers of the diolefin with an aliphatic compound, and the like. The desirable multiolefins or multi-olefinic unsaturates have from 4 to about 14 carbon atoms per molecule and may have substantially any substituent either in a side chain or in the main chain without interference with the polymerization reaction, multiolefins or multi-olefinic unsaturates containing oxygen or other substances in the main chain being satisfactorily useable, and multi-olefinically unsaturated materials having side chain substituents such as chlorine, ethers, and the like, also being useable. According to this definition, any substance having two or more units of unsaturation per molecule between carbon atoms are considered as multiolefins or multi-olefinic unsaturates without regard to the presence of substituents of any sort. The preferred range is from 1% to 30% of the multiolefin or multi-olefinic unsaturates in the mixture, the remainder of the unsaturate being isobutylene. This material is cooled to a temperature within the range between −40° C. and −164° C., the preferred range being from −40° C. to −103° C. The cooling may be obtained in any desired way, as by a refrigerating jacket upon the storage, mixing and reacting containers in which any of the low boiling liquids may be used including such substances as propane, sulfur dioxide, carbon dioxide, either solid or liquid, ammonia, liquid ethane, liquid ethylene or even liquid methane. Alternatively, an internal refrigerant may be used, mixed directly with the olefinic material. For this purpose, the low boiling hydrocarbons are particularly suitable; including such substances as liquid propane, liquid or solid carbon dioxide, liquid ethane, liquid ethylene, and for a limited number of uses, liquid methane.

The mixture preferably also contains a diluent which may be a mono or poly alkyl halide or may be a hydrocarbon diluent or other substances which will be obvious.

When the mixture is complete and cooled to the desired temperature, the catalyst may be introduced. The catalyst may consist of a Friedel-Crafts substance, preferably in solution. The preferred Friedel-Crafts catalysts are aluminum chloride, titanium tetrachloride, boron trifluoride, or the like. Alternatively, any of the Friedel-Crafts catalyst substances disclosed by N. O. Calloway in his article on "The Friedel-Crafts Synthesis" printed in the issue of "Chemical Reviews" published for the American Chemical Society at Baltimore in 1935, in Volume XVII, No. 3, the article beginning on page 327, the list being particularly well shown on page 375, may be used.

For the catalyst solvent, the preferred substances are ethyl or methyl chloride or carbon disulfide. Alternatively, such substances as ethylene dichloride, chloroform, propyl chloride, methyl dichloride, ethyl trichloride, and tetrachloride, and the like may be used, practically any of the mono or poly substituted alkyl halides being useful, altho carbon tetrachloride shows a somewhat reduced catalyst activity when used as solvent. Alternatively, with some of the other Friedel-Crafts substances such as boron trifluoride, aluminum chlorobromide, aluminum chlor alk oxide, and the like, the various relatively low boiling hydrocarbons may be used as catalyst solvent since these materials show an adequate solubility in the hydrocarbons. With boron fluoride, such solvents as liquid ethane, liquid propane, liquid pentane, hexane, light naphtha, and the like, are particularly satisfactory. With aluminum bromide or aluminum chloro bromide, the same substances are also satisfactory. A wide range of other substances is also useful, the requirements being broadly that they have freezing points below 0° C., thereby being low freezing, and boil away from the catalyst substance, or with the catalyst substance, with a minor rise in boiling points only, of no more than 1 or 2°, to leave behind a residue of the Friedel-Crafts salt substantially free from solvent, thereby being non-complex-forming.

The catalyst solution may containe from 0.1% to 20 or 30% or even higher of the dissolved Friedel-Crafts halide, depending upon the metal halide used, the solvent used, the polymerization mixture, and various other factors which will be evident to those skilled in the art. With aluminum chloride in an alkyl halide, the concentration preferably ranges between 0.5% and 3%, although in some instances, the catalyst concentration of 7%, saturation, is useable. The amount of catalyst required varies between 0.5% by weight and 3% by weight of the amount of mixed olefins to be polymerized, this range being dependent to some extent upon the purity of the Friedel-Crafts metal halide; upon the amount of impurities and poison present in the olefinic material and various other factors which will be obvious to those skilled in the art.

The catalyst may be introduced in any convenient way as by a fine spray applied to the surface of the rapidly stirred, cold, olefinic material, or in the form of a fine, high pressure jet directly into the body of the rapidly stirred reaction mixture.

The polymerization reaction begins promptly and continues rapidly as long as the introduction of catalyst is continued. The polymer appears as a white solid which may occur in large masses, or in small nodules or in a more or less fine grained slurry according to the polymerization conditions. The Staudinger molecular weight number of the polymer may vary between 20,000 and 150,000; the preferred molecular weight range being between about 35,000 and about 70,0000, since below 35,000 the tensile strength tends to be undesirably low, and above 60,000 or 70,000, the material is so tough and leathery as to be difficult to mill, calender and extrude. The iodine number lies between about 0.5 and about 50, with the preferred range between about 1 and 10, dependent upon the relative proportion of isobutylene and multiolefin. The material is readily reactive with sulfur, quinone dioxime and its derivatives, and aromatic dinitroso compounds in a curing reaction which destroys the cold flow property and develops a tensile strength ranging from 1800 pounds to 3600 pounds per square inch at break with an elongation ranging from 500% to 1200% at break, and a modulus (pounds pull per square inch to stretch the material by 300%) ranging between 250 and 600, depending to some extent upon the compounding.

The details of the method of producing, compounding and processing the polymer above described are well shown in United States Patent Nos. 2,356,127 and 2,356,128, issued August 22, 1944, to Thomas and Sparks. These patents show the method of producing the polymer in detail, show a portion of the range of equivalents of useable materials, show a portion of the range of useable catalysts, and the like.

According to the present invention, this polymer is compounded on the mill according to the following recipe:

| | Parts |
|---|---|
| Copolymer | 100 |
| Zinc oxide | 2 to 10 |
| Gastex carbon black | 10 to 50 |
| Channel black | 10 to 50 |
| Tuads | 0.5 to 1.5 |
| Captax | 0.2 to 1 |
| Sulfur | 2 |
| Dinitroso compound | 0.0008 to 0.1 |

(Tuads is tetra methyl thiuram disulfide, and Captax is mercapto benzothiazole.)

In preparing this compound the polymer, the zinc oxide, the carbon black and, if desired, the sulfur are placed in the Banbury mixer or on the double roll mill and milled in the usual manner until a homogeneous compound is obtained. To this compound there is then added the desired amount of the dinitroso compound and the milling is continued for several minutes on a very hot mill; temperatures from 250° F. to 325° F. being desirable. The compound may then be removed from the mill and allowed to cool, or the mill may be cooled and the compound with it, and then at the operator's convenience the Tuads and Captax may be added and milled in, preferably upon a relatively cold mill to prevent scorching. The compound is then ready for extruding and the subsequent processing steps.

In the above recipe, carbon black is indicated as desirable. For inner tubes, however, various other filler pigments may be used including vermillion and rouge for red tubes, chrome green or chrome yellow and the like; such substances as clay, whiting, barytes, or the like, also being useful according to the desired type of tube to be made.

It should be noted that a high temperature milling after the addition of the dinitroso compounds is highly desirable to obtain the best results, since while prolonged milling at moderate to low temperatures can be used, it is not as satisfactory nor as effective.

The dinitroso compound preferably is a paradinitroso aromatic compound. The meta dinitroso compounds are nearly as satisfactory, although more difficult to obtain commercially (ortho dinitroso aromatic compounds apparently do not exist and accordingly no knowledge is available whether they are or not useful). Para dinitroso benzene, being easiest to obtain and highly efficient, is the preferred substance, but the para and meta dinitroso derivatives of benzene, cymene, toluene, naphthalene and the like are equally useful.

The compound, prepared according to the above recipe, mills smoothly and easily, calenders very satisfactorily and extrudes very readily. Accordingly, the material, after compounding on the mill, is transferred to the extruder, either immediately, or after such delay as factory processes and schedule may call for. When the factory schedule makes it desirable, the material is put into the extruder and extruded in tube form ready for the preparation of inner tubes.

It may be noted that in amounts above 0.5%, that is, from 1% to 5%, para dinitroso benzene is a curing agent and the curing occurs at room temperature without the necessity for the application of heat. In amounts less than 0.1%, the dinitroso benzene compounds are not curing agents since they do not develop in the polymer any substantial tensile strength and do not destroy the cold flow and molding properties of the polymer. Nevertheless, whatever the reaction is which occurs in the compound of the present invention, it occurs on the mill or in a relatively short time of storage, a few hours or a day, at most.

The resulting polymer, as above pointed out, is not noticeably changed in its milling, calender and extruding properties, and accordingly no question of scorching or of partial cure arises. Nevertheless, when the extruded tube is handled, the amount of bruising which follows the necessary handling is very greatly reduced to a small part of that which occurs with the untreated polymer, the inspection loss due to bruise damage in the plant being reduced to a very small fraction of the loss previously encountered. Similarly, when the tubes are stored in trays during the manufacturing operations, the fold damage where the tube is folded over, not flattened down into the tray, also is very greatly reduced, and the loss of tubes because of undue thinning at the tube fold which shows up particularly and is particularly troublesome in the "forming" operation used to convert the structure from a straight tube to an annular tube, nearly disappears. Similarly, damage from the splicing clamp is very greatly reduced and the inspection loss due to thin spots and irregular splicing also is reduced to a very small fraction of the amount which otherwise occurs.

The reasons for this increase in bruise resistance, fold resistance and clamp resistance are entirely unknown since the characteristics of the polymer are not changed in other respects sufficiently to be significant, although, of course, trial for bruise resistance shows the gain.

Example

A series of compounds were prepared according to the following recipe:

|  | Compound Number | | | |
| --- | --- | --- | --- | --- |
|  | 1 | 2 | 3 | 4 |
| Polymer | 100 | 100 | 100 | 100 |
| Zinc Oxide | 5 | 5 | 5 | 5 |
| MT Black (Thermax) | 35 | 35 | 35 | 35 |
| EPC Black (Cabot #9) | 15 | 15 | 15 | 15 |
| Petrolatum | 2 | 2 | 2 | 2 |
| Glycerin |  |  |  |  |
| Dinitroso benzene | 0.05 | 0.033 | 0.016 |  |

In each of the above recipes, when a reasonably homogeneous blend had been obtained, the milling of the compound was conducted for 5 minutes at 300° F. To each compound there were then added the following items after cooling the mill to about 235° F.

|  | Compound Number | | | |
| --- | --- | --- | --- | --- |
|  | 1 | 2 | 3 | 4 |
| Sulfur | 2 | 2 | 2 | 2 |
| Tuads | 1 | 1 | 1 | 1 |
| Captax | 0.5 | 0.5 | 0.5 | 0.5 |
| Glycerin | 1.5 | 1.5 | 1.5 | 1.5 |

Inspection tests before and after curing were then made on these compounds to yield the following inspection record.

|  | Compound Number | | | |
| --- | --- | --- | --- | --- |
|  | 1 | 2 | 3 | 4 |
| Mooney Viscosity: 5' @ 212° F. | 53 | 49 | 47 | 48. |
| Williams' Plasticity-Recovery at— |  |  |  |  |
| 40° C | 170-18 | 177-17 | 162-14 | 162-12. |
| 70° C | 126-5 | 123-2 | 111-6 | 114-1. |
| Extrusion Rate: |  |  |  |  |
| Ins. per minute | 68 | 72 | 80 | 92. |
| Gms. per minute | 156 | 172 | 184 | 180. |
| Gms./inch | 2.29 | 2.39 | 2.30 | 1.96. |
| Extrusion Appearance: |  |  |  |  |
| Tack | V. Sl. Tacky | V. Sl. Tacky | V. Sl. Tacky | V. Sl. Tacky. |
| Hardness | Soft | Soft | Soft | Soft. |
| Porosity | Nonporous | Nonporous | Nonporous | Nonporous. |
| Bruise Resistance | Good | V. Good | Good | Poor. |
| Appearance | Smooth—Sl—Swollen | Smooth—Sl—Swollen | Smooth—Sl—Swollen | Smooth—Sl—Swollen. |
| Unaged Cures: |  |  |  |  |
| Tensile-Elongation Modulus @ 300%— |  |  |  |  |
| 4' @ 320° F | 1616-837 | 1633-887 | 1660-803 | 1387-787. |
|  | 225 | 150 | 205 | 132. |
| 8' @ 320° F | 2020-800 | 2017-823 | 2110-803 | 2138-817. |
|  | 339 | 384 | 338 | 264. |
| 16' @ 320° F | 1948-660 | 1947-730 | 2147-720 | 2050-797. |
|  | 600 | 557 | 501 | 454. |
| 32' @ 320° F | 1722-563 | 1715-567 | 1755-620 | 1958-677. |
|  | 746 | 793 | 591 | 612. |
| Tear Test @ R. T.: |  |  |  |  |
| 4' @ 320° F | 90 | 225 | 220 | 165. |
| 8' @ 320° F | 210 | 570 | 245 | 255. |
| 16' @ 320° F | 145 | 165 | 190 | 150. |
| 32' @ 320° F | 115 | 130 | 100 | 100. |

These results show the relatively minor change in properties of the polymer after the treatment according to the present invention.

These several compounds were then put through the usual shop processing for the production of inner tubes, and it was found that the inspection loss due to weak spots was, for the first and second of these compounds, approximately half or a little less of the shop loss of the fourth of the compounds, indicating a very substantial gain in factory production and greatly reducing the shop loss from bruising and damage during the "forming" steps.

Thus the invention treats of low temperature isobutylenemultiolefin polymer on the mill with less than 1% of a dinitroso aromatic compound to increase the resistance of the compounded polymer to damage from bruising, folding and clamping, and thereby reduce the number of defective articles manufactured.

This application is a continuation in part of our prior-filed applications Serial No. 471,372 filed January 5, 1943 now abandoned; Serial No. 507,188 filed October 21, 1943 now abandoned; Serial No. 553,470, filed September 9, 1944; and Serial No. 558,455, filed October 12, 1944.

While there are above disclosed but a limited number of embodiments of the process and product of the invention, it is possible to produce still other embodiments without departing from the inventive concept herein disclosed and it is therefore desired that only such limitations be imposed on the appended claims as are stated therein or required by the prior art.

The invention claimed is:

1. A polymer composition having high bruise, fold and clamp damage resistance comprising an interpolymer of isobutylene in major proportion with a multi-olefinic unsaturate having from 4 to 14 carbon atoms per molecule in minor proportion having a Staudinger molecular weight number within the range between 30,000 and 80,000, together with curing agents and pigments and from 0.0008 to 0.1% of an aromatic dinitroso compound the said compound being characterized by an uncured condition, thermoplasticity, the capability of curing with surfur and freedom from cold flow at room temperature.

2. A polymer composition having high bruise, fold and clamp damage resistance comprising an interpolymer of isobutylene in major proportion with a multi-olefinic unsaturate having from 4 to 14 carbon atoms per molecule in minor proportion having a Staudinger molecular weight number within the range between 30,000 and 80,000, together with curing agents and pigments and from 0.0008 to 0.1% of dinitroso benzene the said compound being characterized by an uncured condition, thermoplasticity, the capability of curing with sulfur and freedom from cold flow at room temperature.

3. A polymer composition having high bruise, fold and clamp damage resistance comprising an interpolymer of isobutylene in major proportion with a multi-olefinic unsaturate having from 4 to 14 carbon atoms per molecule in minor proportion having a Staudinger molecular weight number within the range between 30,000 and 80,000, together with curing agents and pigments and from 0.0008 to 0.1% of dinitroso cymene the said compound being characterized by an uncured condition, thermoplasticity, the capability of curing with sulfur and freedom from cold flow at room temperature.

4. A polymer composition having high bruise, fold and clamp damage resistance comprising an interpolymer of isobutylene in major proportion with a multi-olefinic unsaturate having from 4 to 14 carbon atoms per molecule in minor proportion having a Staudinger molecular weight number within the range between 30,000 and 80,000, together with curing agents and pigments and from 0.0008 to 0.1% of dinitroso naphthalene the said compound being characterized by an uncured condition, thermoplasticity, the capability of curing with sulfur and freedom from cold flow at room temperature.

5. A polymer composition characterized by high resistance to bruise, fold and clamp damage comprising a low temperature interpolymer of a major proportion of isobutylene with a minor proportion of a multiolefin having from 4 to 14 carbon atoms per molecule, characterized by a Staudinger molecular weight number within the range between 30,000 and 80,000, together with curing agents and pigments and from 0.1% to 0.0008% of an aromatic dinitroso compound the said compound being characterized by an uncured condition, thermoplasticity, the capability of curing with sulfur and freedom from cold flow at room temperature.

6. A polymer composition characterized by high resistance to bruise, fold and clamp damage comprising a low temperature interpolymer of a major proportion of isobutylene with a minor proportion of isoprene, characterized by a Staudinger molecular weight number within the range between 30,000 and 80,000, together with curing agents and pigments and from 0.1% to 0.0008% of an aromatic dinitroso compound the said compound being characterized by an uncured condition, thermoplasticity, the capability of curing with sulfur and freedom from cold flow at room temperature.

7. A polymer composition characterized by high resistance to bruise, fold and clamp damage comprising a low temperature interpolymer of a major proportion of isobutylene with a minor proportion of isoprene, characterized by a Staudinger molecular weight number within the range between 30,000 and 80,000, together with curing agents and pigments and from 0.1% to 0.0008% of dinitroso benzene the said compound being characterized by an uncured condition, thermoplasticity, the capability of curing with sulfur and freedom from cold flow at room temperature.

8. A polymer composition characterized by high resistance to bruise, fold and clamp damage comprising a low temperature interpolymer of a major proportion of isobutylene with a minor proportion of isoprene, characterized by a Staudinger molecular weight number within the range between 30,000 and 80,000, together with curing agents and pigments and from 0.1% to 0.0008% of dinitroso cymene the said compound being characterized by an uncured condition, thermoplasticity, the capability of curing with surfur and freedom from cold flow at room temperature.

9. In a process for the preparation of inner tubes from a low temperature polymer prepared by the steps of polymerizing a major proportion of isobutylene with a minor proportion of a multi-olefin having from 4 to 14 carbon atoms at a temperature within the range between —40° C. and —103° C. by the application of a dissolved Friedel-Crafts catalyst, comprising the steps of milling the polymer, milling into the polymer pigments to good dispersion, milling into the polymer from 0.0008 to 0.1% of an aromatic dinitroso compound at a temperature between 240° F. and 320° F. then cooling the mill and milling into the polymer appropriate curing agents and thereafter shaping the material into inner tube form.

10. In a process for the preparation of inner tubes from a low temperature polymer prepared by the steps of polymerizing a major proportion of isobutylene with a minor proportion of a multi-olefin having from 4 to 14 carbon atoms at a temperature within the range between —40° C. and —103° C. by the application of a dissolved Friedel-Crafts catalyst, comprising the steps of milling the polymer, milling into the polymer pigments to good dispersion, milling into the polymer from 0.0008 to 0.1% of an aromatic dinitroso compound at a temperature between 240° F. and 320° F., then cooling the mill and milling into the polymer appropriate curing agents, thereafter extruding the compound in tube shape, splicing the ends to form a tubular ring, forming the ring into an annular contour, and thereafter mold curing the tube.

11. The process according to claim 10 in which isoprene is the multi-olefin used, and in which 0.016 to 0.05% of dinitrosobenzene is used as the dinitroso compound.

JOHN REHNER, Jr.
PAUL J. FLORY.

REFERENCES CITED

The following references are of record in the file of this patent:

UNITED STATES PATENTS

| Number | Name | Date |
|---|---|---|
| 1,643,999 | Semple | Oct. 4, 1927 |
| 2,070,525 | Eberhard | Feb. 9, 1937 |
| 2,393,321 | Haworth | Jan. 22, 1946 |

OTHER REFERENCES

Page 628, Beilstein's Handbuch de Organische Chemie; 4th edition, vol. 7, 1925.

Pages 500 to 506, Industrial and Engineering Chemistry, May 1946.